T. J. PETERS.
APPARATUS FOR DRYING TOMATOES AND FRUIT.
APPLICATION FILED JULY 14, 1916.
1,259,774.
Patented Mar. 19, 1918.
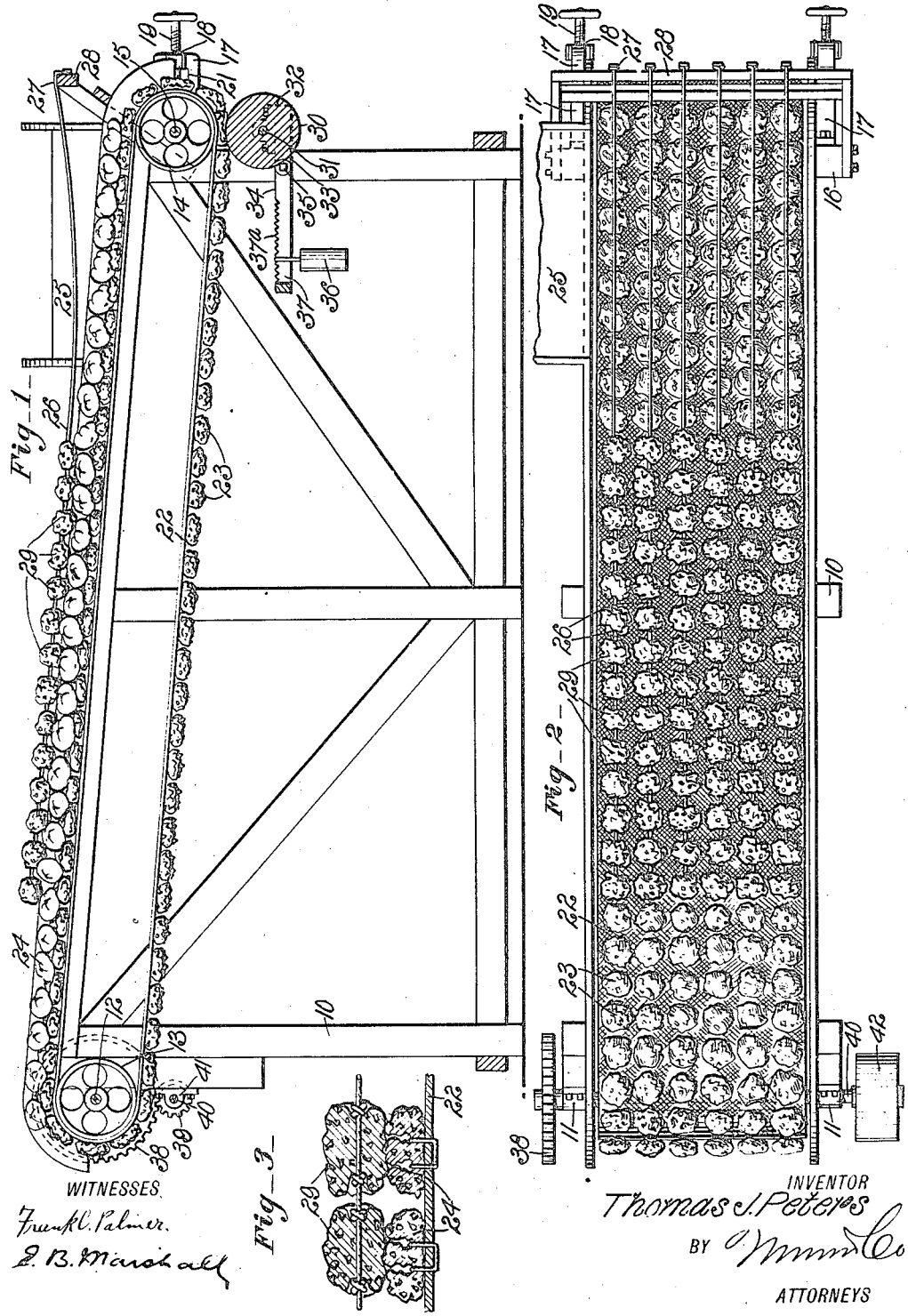
WITNESSES
Frank C. Palmer.
E. B. Marshall
INVENTOR
Thomas J. Peters
BY
ATTORNEYS

UNITED STATES PATENT OFFICE.

THOMAS JEFFERSON PETERS, OF PETERS, FLORIDA.

APPARATUS FOR DRYING TOMATOES AND FRUIT.

1,259,774.  Specification of Letters Patent.  Patented Mar. 19, 1918.

Application filed July 14, 1916. Serial No. 109,409.

*To all whom it may concern:*

Be it known that I, THOMAS J. PETERS, a citizen of the United States, and a resident of Peters, in the county of Dade and State of Florida, have invented a new and Improved Apparatus for Drying Tomatoes and Fruit, of which the following is a full, clear, and exact description.

My invention has for its object to provide an apparatus which will quickly and thoroughly dry tomatoes and fruit without injuring their tender skins.

Additional objects of the invention will appear in the following specification in which the preferred form of the invention is disclosed.

In the drawings similar reference characters denote similar parts in all the views, in which—

Figure 1 is a sectional elevation showing my drying apparatus;

Fig. 2 is a plan view of Fig. 1; and

Fig. 3 is a transverse sectional view showing the drying means.

In order that tomatoes and fruit may be sold at the best market price, it is important that they be washed to remove leaves and dirt, and this makes it necessary to provide for quickly and thoroughly drying the tomatoes and fruit without in any way injuring them. The apparatus which I describe in this specification operates automatically to dry the tomatoes and fruit rapidly, without the slightest injury to very tender fruit.

By referring to the drawings it will be seen that a frame 10 is provided having bearings 11 in which is journaled a shaft 12 on which a drum 13 is mounted. At a distance from the drum 13 there is a second drum 14 which is mounted on a shaft 15 journaled in bearings 16 which are supported by brackets 17 having threaded openings 18 in which screws 19 are disposed, these screws 19 engaging an end of the frame 10 which is disposed transversely through openings 21 in the brackets 17. This means is provided for moving the bearings 16 of the shaft 15 to or from the shaft 12 as may be desired to tighten a conveyer belt 22, which is disposed around the drums 13 and 14, there being secured to the conveyer belt 22 sponges or other absorbent members 23 which are preferably spaced apart, as illustrated in the drawings, so that tomatoes or other fruit 24 will be engaged by the sponges or other absorbent members 23, to dry the tomatoes or fruit 24 which have been previously washed, while the tomatoes 24 are carried by the sponges or absorbent members 23 which are secured to the conveyer belt 22.

In the construction shown in the drawings, the tomatoes are deposited on the sponges or other absorbent members 23 by a chute 25, and are carried upwardly in the direction of the drum 13 which is mounted on the shaft 12, the shaft 12 being at a higher elevation than the shaft 15.

As an additional drying means, and also as a means for moving the tomatoes or other fruit on the sponges or other absorbent members 23, I provide a plurality of flexible members 26 which are disposed substantially parallel and which have one set of ends secured at 27 to a bracket 28 extending upwardly from the frame 10. To each of these members 26 there are secured a plurality of sponges or other absorbent members 29 which rest against the tomatoes 24, which are carried in the direction of the drum 13 by means of the belt 22 with its sponges or other absorbent members 23. The sponges or other absorbent members 29 serve two purposes, one of which is to turn the tomatoes 24 on the sponges or other absorbent members 23, and the other to assist in the drying of the tomatoes 24 as they move thereby. It will be understood that inasmuch as the tomatoes 24 are moved upwardly in the direction of the drum 13, this upward movement assists the sponges or other absorbent members 29 to roll the tomatoes 24 on the sponges or other absorbent members 23. The members 26 are preferably disposed through openings in the sponges or other absorbent members 29, and the sponges or other absorbent members 23 are preferably cut so that their outer surfaces will all be substantially the same distance from the conveyer belt 22.

As a means to remove excess moisture from the sponges or other absorbent members 23, I prefer to make use of a wringer device which consists of a drum 30 journaled in bearings 31 to a bracket 32 mounted on an arm 33 of a lever 34 fulcrumed to the frame 10 at 35, a counterweight 36 being mounted on the other arm 37 of this lever 34, there being notches 37ᵃ in the arm 37 of the lever 34, so that the counterweight 36 may be disposed at any predetermined distance from the fulcrum 35 of the lever, by which arrangement the pressure of the wringer drum 30 against the sponges or other absorbent members 23 may be regulated.

Secured to the shaft 12 there is a gear 38 which meshes with a gear 39 secured to a shaft 40 journaled in bearings 41. A pulley 42 is also secured to the shaft 40 by which the shaft 40 may be driven.

Having thus described my invention, I claim as new and desire to secure by Letters Patent:

1. In an apparatus for drying fruit, a conveyer and absorbent members spaced apart longitudinally and transversely of the apparatus, the absorbent members being carried by the conveyer and being disposed in substantially the same positions relatively to the conveyer at all times.

2. In an apparatus for drying fruit, a support movably mounted, absorbent members mounted on the support and being disposed in substantially the same positions relatively to the support at all times, a conveyer, the support being adapted to be moved away from the conveyer by the engagement of fruit on the conveyer with the absorbent members.

3. In an apparatus for drying fruit, a conveyer, a plurality of elongated members disposed above and longitudinally of the conveyer and secured at one set of ends relatively to the conveyer, and absorbent members spaced apart and mounted on the said members.

4. In an apparatus for drying fruit, a conveyer, and absorbent members spaced apart longitudinally and transversely and secured to the conveyer.

5. In an apparatus for drying fruit, a support, absorbent members spaced apart on the support, a conveyer, and absorbent members spaced apart and secured to the conveyer for carrying fruit into contact with and past the first absorbent members while in contact therewith.

6. In an apparatus for drying fruit, a conveyer, absorbent members secured to the upper surface of the conveyer, a plurality of members disposed above the conveyer and secured at one set of ends relatively to the conveyer, and absorbent members mounted on the said members.

7. In an apparatus for drying fruit, a conveyer, absorbent members secured to the upper surface of the conveyer, a plurality of flexible members secured above the conveyer and secured at one set of ends relatively to the conveyer, and absorbent members mounted on the said members.

8. In an apparatus for drying fruit, a conveyer, absorbent members secured to the upper surface of the conveyer, a plurality of members disposed substantially parallel with each other above the conveyer and secured at one set of ends relatively to the conveyer, and absorbent members mounted on the said members.

9. In an apparatus for drying fruit, two drums spaced apart, a conveyer belt disposed around the drums, absorbent members carried by the conveyer belt, and a wringer roller engaging the absorbent members on the conveyer belt at one of the drums, for the purpose specified.

10. In an apparatus for drying fruit, two drums spaced apart, a conveyer belt disposed around the drums, absorbent members carried by the conveyer belt, a lever fulcrumed adjacent one of the drums, a wringer roller mounted on one arm of the lever for engaging the absorbent members on the conveyer belt at the last mentioned drum, and a counterweight on the other arm of the lever.

11. In an apparatus for drying fruit, a conveyer member having an absorbent surface, a drum with which the conveyer member contacts, a lever fulcrumed adjacent the drum, a wringer roller mounted on an arm of the lever for engaging the conveyer member at the said drum, and a counterweight on the other arm of the lever.

12. In an apparatus for drying fruit, two rotatably mounted drums spaced apart, a conveyer belt disposed around the drums, absorbent members secured to the outer surface of the conveyer belt, a plurality of members disposed above the conveyer belt and secured at one set of ends relatively to the conveyer belt, absorbent members mounted on the first mentioned members, and a wringer roller engaging the first mentioned absorbent members at one of the drums.

13. In an apparatus for drying fruit, two rotatably mounted drums spaced apart, a conveyer belt disposed around the drums, absorbent members carried by the conveyer belt, and adjustable means for moving one drum away from the other.

14. In an apparatus for drying fruit, a conveyer having an absorbent surface, a plurality of members secured to one set of ends relatively to the conveyer and disposed at their outer ends adjacent the absorbent surface of the conveyer, and absorbent members mounted on the first mentioned members.

15. In an apparatus for drying fruit, a conveyer having an absorbent surface, a plurality of members secured to one set of ends relatively to the conveyer and disposed at their outer ends adjacent the absorbent surface of the conveyer, absorbent members mounted on the first mentioned members, and directing means for feeding fruit to the conveyer under the first mentioned members.

16. In an apparatus for drying fruit, a conveyer having an absorbent surface, and means to move the conveyer upwardly at an incline so that fruit carried on the absorbent surface will roll for drying purposes.

17. In an apparatus for drying fruit, a conveyer, absorbent members extending upwardly from the conveyer, and means to move the conveyer upwardly at an incline so that fruit carried on the absorbent members will roll for drying purposes.

18. In an apparatus for drying fruit, an absorbent member, a conveyer having an absorbent surface disposed adjacent the absorbent member, and means to move the conveyer upwardly relatively to the absorbent member and at an incline so that fruit carried by the absorbent surface of the conveyer will be rolled by the absorbent member.

THOMAS JEFFERSON PETERS.